United States Patent [19]
Winston et al.

[11] Patent Number: 5,491,620
[45] Date of Patent: Feb. 13, 1996

[54] LIGHT SOURCE ILLUMINATION SYSTEM

[75] Inventors: Roland Winston, Chicago; Philip L. Gleckman, Oak Park, both of Ill.

[73] Assignee: NiOptics Corporation, Evanston, Ill.

[21] Appl. No.: 342,393

[22] Filed: Nov. 18, 1994

Related U.S. Application Data

[63] Continuation of Ser. No. 901,885, Jun. 22, 1992, abandoned.

[51] Int. Cl.⁶ .................................. F21V 8/00; F21V 7/02
[52] U.S. Cl. ............................ 362/346; 362/32; 362/298; 362/300
[58] Field of Search .............................. 362/31, 32, 298, 362/300, 302, 26, 346

[56] References Cited

U.S. PATENT DOCUMENTS

| | | | |
|---|---|---|---|
| 4,241,382 | 12/1980 | Daniel | 362/32 |
| 4,460,939 | 7/1984 | Murakami et al. | 362/293 |
| 4,956,759 | 9/1990 | Goldenberg et al. | 362/297 |
| 5,206,699 | 4/1993 | Stewart et al. | 356/30 |

OTHER PUBLICATIONS

"High Collection Nonimaging Optics," W. T. Welford et al., pp. 205–209, 1989.

*Primary Examiner*—Ira S. Lazarus
*Assistant Examiner*—L. Heyman
*Attorney, Agent, or Firm*—Michael D. Rechtin

[57] ABSTRACT

An illumination system having a concave minor for imaging a light source. The illumination system includes a light source, a first concave minor for imaging the light source and a second concave minor for reimaging the imaged light source at another location. The system timber includes a light collecting element passing through the surface of one of the concave mirrors enabling light removal without reimaging the light source outside the radii of curvature of the concave mirrors.

20 Claims, 1 Drawing Sheet

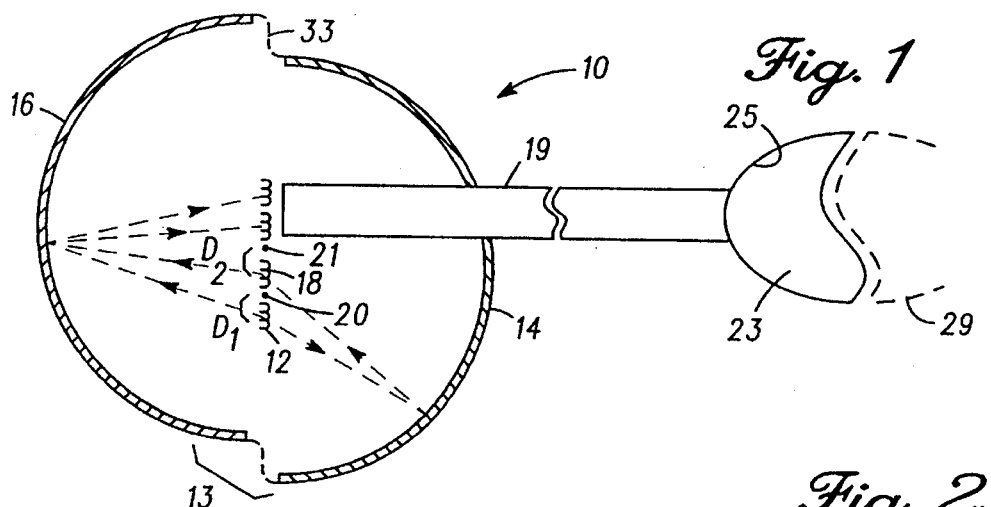
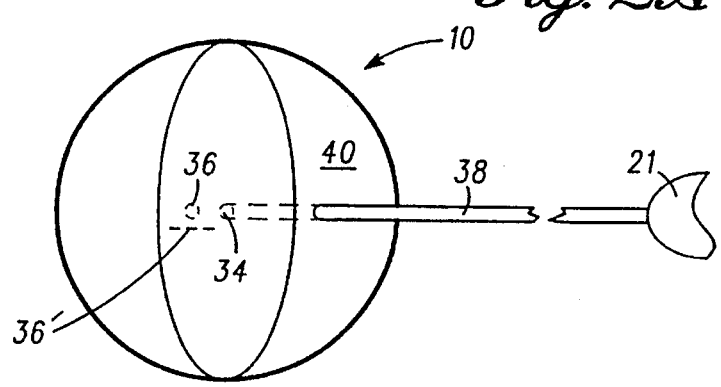
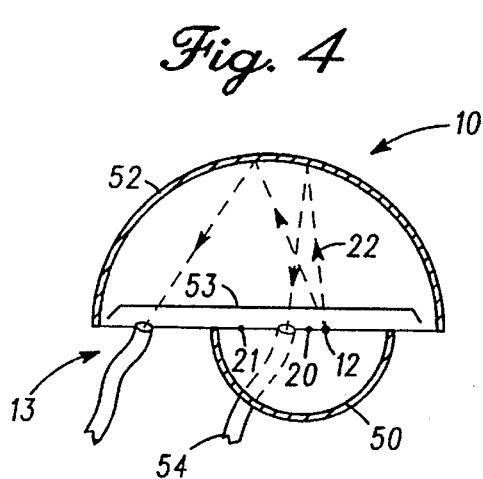
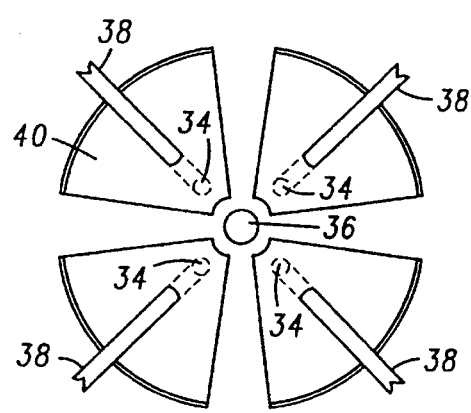
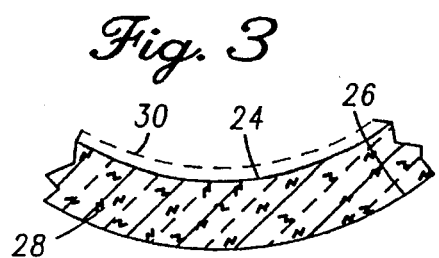

LIGHT SOURCE ILLUMINATION SYSTEM

This is a continuation of application Ser. No. 07/901,885 filed Jun. 22, 1992, abandoned.

The present invention is concerned with an illumination system for a light source including a plurality of concave mirrors for reimaging of the light source at a selected location. More particularly, the invention is directed to a light source illumination system having a plurality of concave minors which reimage the light source and includes a light collecting means for removing the reimaged light source from the confines of the concave mirrors.

A number of optical applications require the production of a controlled light image which is as bright as possible, while achieving efficient use of the light produced. Typical problems encountered include: (1) the presence of a non-uniform light distribution arising from the filament shape of the light source, (2) collection of the light in an efficient manner, (3) controlled directional output of the collected light without loss of brightness, and (4) performance of the above described functions with compact imaging optics but without introduction of excessive aberrations.

OBJECTS OF THE INVENTION

It is therefore an object of the invention to provide a novel optical illumination system having a plurality of concave mirrors for controlling the reimaging of a light source for output and use.

it is yet another object of the invention to provide an improved optical illumination system having at least two mirrors enclosing a light source and reimaging the light source within the mirror enclosure for controlled output and use.

It is a further object of the invention to provide a novel optical illumination system having minors enclosing a light source and an optical collection element entering the mirror enclosure for extracting the light source image for illumination purposes.

It is still another object of the invention to provide an improved optical illumination device including a mirror system for reimaging a light source and a tight collection means passing through the mirror system for removing the light from the mirror system for exterior usage.

Other objects and advantages of the invention will be apparent from the detailed description and drawings described below.

BRIEF DESCRIPTION OF THE DRAWINGS

FIG. 1 illustrates an optical illumination system including two spherical concave mirrors and a light pipe;

FIG. 2A illustrates an optical illumination system having a plurality of spherical segment mirrors completely enclosing a light source and FIG. 2B shows a top view of FIG. 2A illustrating a plurality of light pipes to remove light for external uses;

FIG. 3 illustrates a cross sectional view of a portion of one of the mirrors shown in FIGS. 1 and 2; and FIG. 4 illustrates a two dimensional type of illumination system having at least one concave semi-circular cylindrical mirror and a light sheet for removal of the light source image.

DETAILED DESCRIPTION OF PREFERRED EMBODIMENTS

An optical illumination system constructed in accordance with the invention is shown in the figures generally at 10. As shown in FIG. 1, the optical illumination system 10 (hereinafter, the "system 10") includes a light source 12, such as a filament or arc source, and a mirror system 13 having a first concave mirror 14 and a second concave mirror 16. In the system 10 the first concave minor 14 images the light source 12 at a first selected location to form an image 18. The second concave mirror 16 reimages the image 18 (the imaged source) at a second selected location, such as on face 32 of light pipe 19. The light pipe thus functions to collect the light from the light source 12 and the image 18 and remove the light for use outside the system 10. The image 18 can therefore be extracted by the light pipe 19 passing through the minor 14, or extracted by other such means, and then output to optical means, such as a compound parabolic concentrator 23 which has a reflector mirrored surface 25, for various optical applications. In other embodiments the concentrator 23 can include an elliptically-shaped mirror surface 27 (in phantom in FIG. 2A) and a nonimaging mirror 29 in FIG. 1 in phantom.

In the preferred form of the invention the light source 12 is displaced from a first center of curvature 20 and second center of curvature 21 for the first and second concave minors 14 and 16, respectively. These mirrors 14 and 16 operate to position the image 18 for removal from the system 10. However, in order to minimize brightness loss and optimize efficiency, the mirror system 13 exhibits certain spacing relationships between (a) the light source 12 and the first center of curvature 20 and (b) between the image 18 and the second center of curvature 21. Preferably, the light source 12 is displaced a distance $D_1$ from the center of curvature 20 with $D_1$ being less than about one-fourth the radius of curvature of the first concave mirror 14. In addition, the image 18 is displaced a distance $D_2$ from the center of curvature 21 with $D_2$ being less than about one-fourth the radius of curvature of the second concave mirror 16. Alternatively, one can express this preferred arrangement as requiring the light source 12 to be within the above-stated distance $D_1$ of the center of curvature 20 and the image 18 is within the above-stated $D_2$ distance of the center of curvature 21.

As shown in FIG. 3, one or more of the mirrors 14 and 16 can also include a front surface 24 and a back surface 26 and an absorbing medium 28 for selectively removing unwanted portions of the light spectrum from the light source 12. In addition, the minor system 13 can include a dielectric layer 30 (the outer boundary is shown in phantom in FIG. 3 ). This dielectric layer 30 allows selective transmission or reflection of parts of the light spectrum from the light source 12.

In other forms of the invention the mirror system 13 and the position of the light source 12 can be constructed to enable reimaging of the light source in substantial coincidence with the light source 12 itself. This can be particularly useful for a filamentary source having substantial light level nonuniformities. For example, one can reimage the light source 12 such that intensity lows of the image 18 are matched with intensity highs from the light source 12. This methodology is also useful for optically thin sources in order to improve brightness.

The mirror system 13 can include a plurality of mirrors, such as the two mirrors 14 and 16 in FIG. 1 or the spherically segmented mirror 32 in FIG. 2. The system 13 can even be a single mirror having regions of varying curvature (see FIG. 1 with phantom lines 33 forming a continuous surface mirror. The spherical segments 32 in the embodiment of FIG. 2 have the advantage of requiring only a single reflection to form an image 3a from light source 36. Also note planer light source 36 (in phantom in FIG. 2A) for an alternative embodiment. Such a geometry also can ensure collecting virtually all the light emitted from the light source 36.

As noted hereinbefore the image 18 in FIG. 1 is removed by the light pipe 19 for various optical uses. The system 10 in FIG. 2 also includes means for collecting the light from the reimaged light source (the image 18). The collecting means is a light pipe 38, which passes through a surface 40 of one of the mirrors. The light pipe 38 thus enables light to be removed for use without reimaging the light source 12 outside the radius of curvature described by the concave mirrors. If such a substantial displacement were used, it would result in loss of brightness due to substantial aberrations. In the most preferred embodiment at least one of the concave mirrors comprises a spherical mirror in order to minimize aberration effects. In order to remove all the light associated with the image 34, one can use a plurality of the light pipes 38 as shown in FIG. 2B.

The above described embodiments can also be applied to two dimensional optical illumination systems. In such a system (see FIG. 4) at least one of the concave mirrors 50 and 52 comprises a concave semi-circular cylinder 53, and the light pipe can take the form of a light sheet 54 passing through an opening in one of the concave mirrors 50 and 52.

Further advantages and features of the invention will be appreciated by reference to the figures and to the claims set forth hereinafter. Therefore, while preferred embodiments of the invention have been described, it will be clear to those of ordinary skill in the art that changes and modifications can be made without departing from the invention in its broader aspects.

What is claimed is:

1. An illumination system, comprising:

a light source;

a first concave mirror imaging said light source at a first selected location;

a second concave mirror for reimaging said imaged light source at a second selected location, said first and second concave mirrors establishing interior confines and enabling removal of the light from within the confines of said first and second concave mirrors, said first and second concave mirrors further being separated by an imaginary plane therebetween and said light source and said second selected location being disposed at least one of on the plane or on one side of the plane; and means for collecting the light from said reimaged light source, said collection means passing through a surface of one of said concave mirrors enabling light removal without reimaging said light source outside the radius of curvature described by said concave mirrors.

2. The illumination system as defined in claim 1 wherein at least one of said concave mirrors comprises a spherical mirror.

3. The illumination system as defined in claim 1 wherein said means for collecting light comprises a light pipe disposed through a hole in one of said concave mirrors.

4. The illumination system as defined in claim 1 wherein said light source is imaged as close as possible to said light source to minimize aberration effects.

5. The illumination system as defined in claim 1 wherein said light source is displaced from the center of curvature of said first concave mirror at a distance less than about one quarter of the radius of curvature of said first concave mirror.

6. The illumination system as defined in claim 1 wherein said light source is displaced from the center of curvature of said first mirror a distance less than about one-quarter of the radius of curvature of said first concave mirror and the imaged light source displaced from the center of curvature of said second mirror a distance less than one-quarter of the radius of curvature of said second concave mirror.

7. The illumination system as defined in claim 1 further including at least another concave mirror resulting in enclosing about $4\pi$ steradians about said light source.

8. The illumination system as defined in claim 7 wherein said system includes at least four concave mirrors enclosing said light source.

9. The illumination system as defined in claim 8 wherein said concave mirrors comprises spherical mirrors.

10. The illumination system as defined in claim 1 wherein said at least one of said concave mirrors comprises a concave semi-circular cylinder.

11. The illumination system as defined in claim 1 wherein said light source comprises a planar light source.

12. The illumination system as defined in claim 1 wherein the means for collecting the light comprises a light sheet passed through an opening in one of said concave mirrors.

13. The illumination system as defined in claim 1 where said light source comprises an optically thin source.

14. The illumination system as defined in claim 13 wherein said light source comprises a filamentary source.

15. The illumination system as defined in claim 1 wherein said means for collecting light comprises a light pipe dispersed through a hole in one of said concave mirrors, and where said collected light output from said light pipe comprises a uniform area of light intensity.

16. The illumination system as defined in claim 1 wherein said means for collecting light comprises a light pipe disposed through a hole in one of said concave mirrors and further including a nonimaging minor disposed at the output end of said light pipe.

17. The illumination system as defined in claim 1 wherein said means for collecting light comprises a light pipe disposed through a hole in one of said concave mirrors and further including a reflector mirror redirecting the light output from said light pipe.

18. The illumination system as defined in claim 17 wherein said reflector mirror comprises an elliptically shaped mirror.

19. An illumination system, comprising:

a light source;

a mirror system having a first concave mirror portion and a first center of curvature, said first mirror portion for imaging said light source at a first selected location with said light source being displaced from the first center of curvature a distance less than about one-quarter of the radius of said first center of curvature and further having a second concave mirror portion and a second center of curvature a distance less than one-quarter of the radius of curvature of said second concave mirror portion; and means for collecting the light from said reimaged light source, said collecting means passing through a surface of said mirror enabling light removal without reimaging said light source outside the radius of curvature described by either of said concave mirror portions.

20. An illumination system, comprising:

a light source;

a mirror system having at least a first concave mirror portion and a second concave mirror portion with internal mirror surfaces, said mirror system forming a light source image within the confines of said mirror system, said formed light source image being positioned for removal from within the confines of said first and second concave mirror portions and further being positioned apart from said internal mirror surfaces and apart from he position of said light source and toward but apart from the location of the center of curvature of said first and second concave mirrors; and means for collecting the light from said light source image and said collecting means passing through a surface of said mirror system enabling light removal without reimaging said light source image outside the confines of said mirror system circumscribed by the radius of curvature of said first and second concave mirror portions.

* * * * *

UNITED STATES PATENT AND TRADEMARK OFFICE
CERTIFICATE OF CORRECTION

PATENT NO.: 5,491,620

DATED: February 13, 1996

INVENTOR(S): Roland Winston, Philip L. Gleckman

It is certified that error appears in the above-identified patent and that said Letters Patent is hereby corrected as shown below:

Item [57], Abstract, line 3, and line 4, delete "minor" and insert --mirror--.

Item [57], Abstract, line 5, delete "timber" and insert --further--.

Column 2, line 5, delete "minor" and insert --mirror--.

Column 2, line 13, delete "minor" and insert --mirror--.

Column 2, line 45, delete "minor" and insert --mirror--.

Column 2, line 66, delete "3a" and insert --34--.

Column 2, line 67, delete "36" and insert --36'--.

Signed and Sealed this

Sixteenth Day of September, 1997

Attest:

BRUCE LEHMAN

Attesting Officer

Commissioner of Patents and Trademarks